Figure 5A:
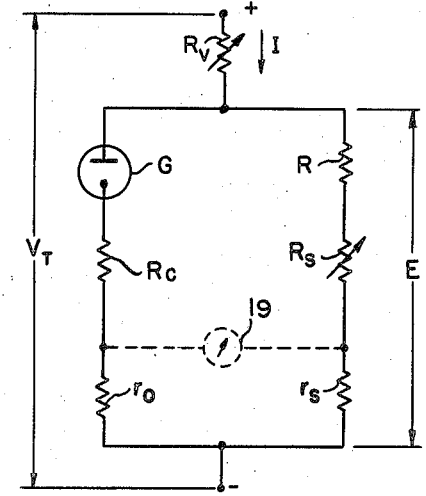

April 8, 1958 W. G. AMEY ET AL 2,830,252
ARRANGEMENTS FOR PROVIDING STANDARDIZED
VOLTAGE OR CURRENT
Filed Aug. 2, 1954 3 Sheets-Sheet 1
*Fig. 1*
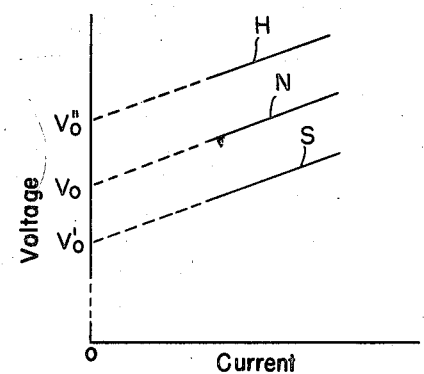
*Fig. 2A* *Fig. 2B* *Fig. 3A* *Fig. 3B*
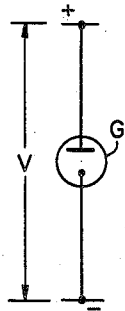 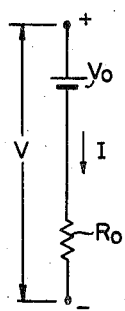 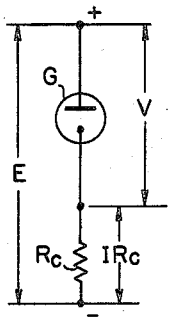 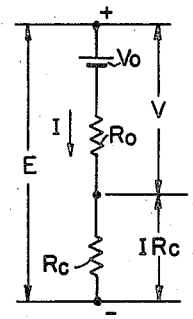
*Fig. 4*
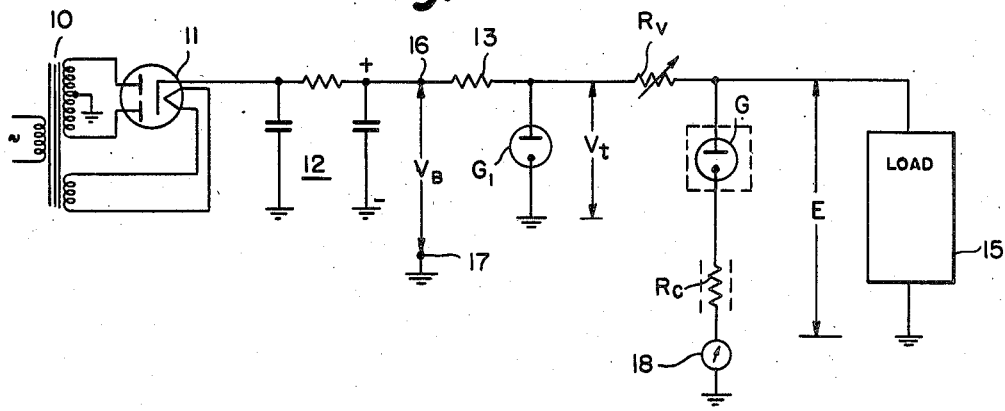

April 8, 1958   W. G. AMEY ET AL   2,830,252
ARRANGEMENTS FOR PROVIDING STANDARDIZED
VOLTAGE OR CURRENT
Filed Aug. 2, 1954   3 Sheets-Sheet 2

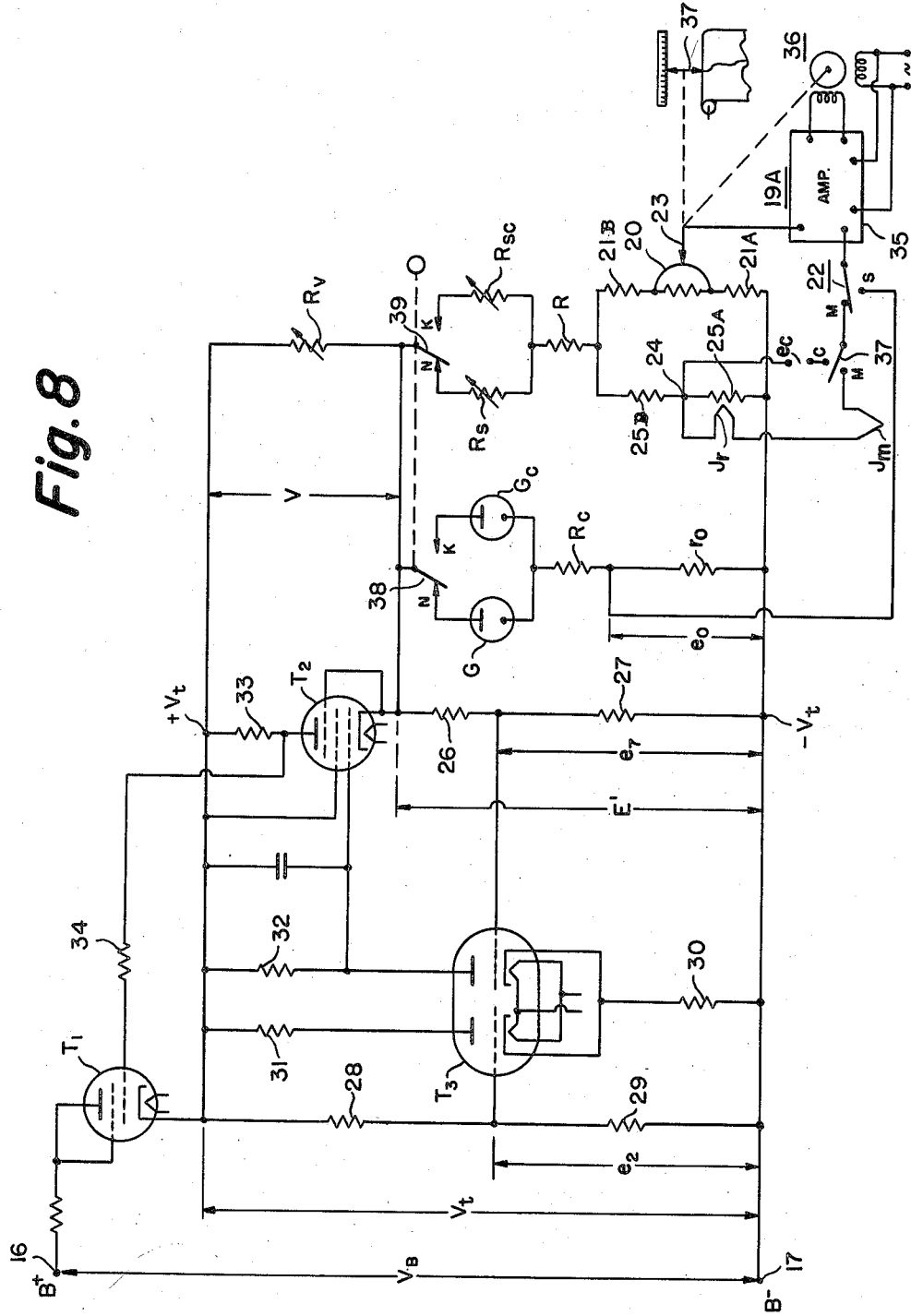

United States Patent Office 2,830,252
Patented Apr. 8, 1958

2,830,252

ARRANGEMENTS FOR PROVIDING STANDARDIZED VOLTAGE OR CURRENT

William G. Amey, Philadelphia, and William Russell Clark, Jenkintown, Pa., assignors to Leeds and Northrup Company, Philadelphia, Pa., a corporation of Pennsylvania Application August 2, 1954, Serial No. 447,146

15 Claims. (Cl. 323—22)

This invention relates to arrangements providing a standardized voltage or current and which are particularly suited for use in precision measuring equipment subjected to a wide range of ambient temperatures including low temperatures for which standard cells are inoperative.

In accordance with one aspect of the invention, a reference or standardized voltage is derived from a supply source subject to variations by a network including, in series, a gaseous discharge tube calibrated at a predetermined value of tube current and temperature-sensitive resistance means traversed by the tube current and subjected to the same ambient temperature conditions as the tube. The resistance and coefficient of resistance of the temperature-sensitive resistance means are such that the voltage across the series combination of said tube and resistance means remains essentially constant despite the effect of changes in ambient temperature upon the voltage/current characteristic of the tube.

Also in accordance with the invention and in embodiments thereof providing a standardized voltage or current, the gaseous discharge tube, and also temperature-sensitive resistance means, when used, is included in one branch of a network having a second, parallel branch including the load. The two parallel branches of the network are connected to the supply source through standardizing-resistance means adjustable to provide said predetermined value of tube current to maintain a desired voltage across or desired current through the load; more specifically and in preferred arrangements, the two branches are included in a network which is balanced only when the tube current is of said predetermined value. Further and more specifically, the second branch may include a shunted slide-wire calibrated to serve as the balancing slidewire of a potentiometer in the measurement of unknown voltages.

Further in accordance with the invention, the current to the network from the supply source is supplied through a rheostat tube whose control grid bias is controlled by an amplifier system responsive to the difference between two input signals respectively varying in accordance with the voltage across the parallel branches of the network and with the sum of that voltage and the voltage across the adjustable standardizing resistance means. More specifically and preferably, these signals are derived respectively from voltage-divider networks to which said voltage and said voltage sum are applied so that adequate amplifier gain and sensitivity may be attained with the voltage across the standardizing resistance used as the source of anode-cathode voltage of one stage of the amplifier and the aforesaid voltage sum used as the source of anode-cathode voltage for another stage of the amplifier.

The invention further resides in sources of regulated voltage and current having the features of combination and arrangement hereinafter described and claimed.

Figure 5B:
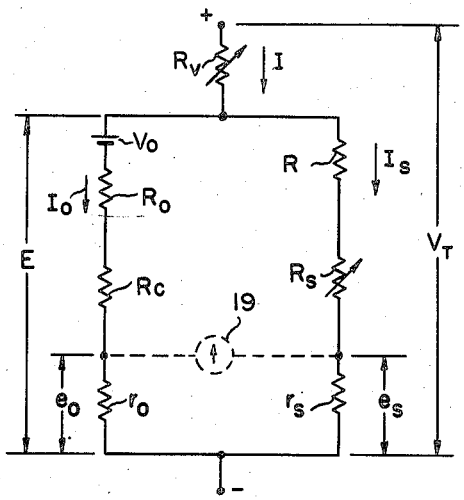
Figure 6:
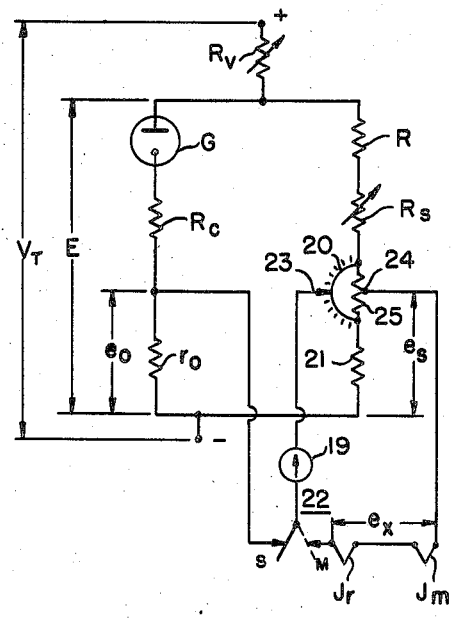
Figure 7:
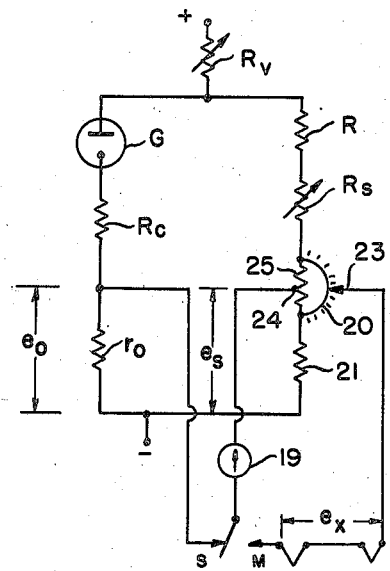

For a more detailed understanding of the invention and for illustration of various embodiments thereof, reference is made to the accompanying drawings in which:

Figs. 1, 2A and 2B are explanatory figures referred to in discussion of the regulation characteristics of gaseous discharge tubes;

Fig. 3A schematically illustrates a basic reference-voltage network including a gaseous discharge tube and a temperature-compensating resistor;

Fig. 3B is an explanatory figure illustrating, for purposes of analysis of Fig. 3A, its electrical equivalent;

Fig. 4 schematically illustrates a regulated power supply incorporating the network of Fig. 3A;

Fig. 5A schematically illustrates a more complex network providing voltage and current standardization and including the basic network of Fig. 3A;

Fig. 5B is an explanatory figure showing, for purposes of analysis, the electrical equivalent of Fig. 5A;

Figs. 6 and 7 schematically illustrate modifications of Fig. 5A used in checking standardization and for measurement of unknown voltages; and Fig. 8 schematically illustrates a precision temperature-measuring system embodying features of preceding figures.

Within normal operating range and at room temperature, the normal voltage/current characteristic of a gaseous discharge tube, exemplified by tube G of Fig. 2A, is similar to that represented by the solid portion of line N of Fig. 1. Such characteristic for analytical purposes is the same as that of the equivalent circuit of Fig. 2B which consists of a battery in series with a fixed resistance; the magnitude of the battery voltage $V_0$ being equal to the zero-current intercept of the dotted extension of line N and the magnitude of resistance $R_0$ being numerically equal to the slope of line N.

Most gaseous discharge tubes suitable as stable reference-voltage devices exhibit such dependence on ambient temperature that at an elevated temperature the voltage/current characteristic shifts to line S of Fig. 1 whereas at a subnormal temperature the voltage/current characteristic shifts to line H. Over a wide range of ambient temperature, say from $-55°$ C. to $+55°$ C., this temperature coefficient substantially degrades the utility of gaseous discharge tubes as voltage reference devices.

Since the characteristics H, S are essentially parallel to the normal characteristic N, the primary effect of a temperature variation is a change in the zero-intercept as indicated by $V_0'$ and $V_0''$. With reference to the equivalent circuit of Fig. 2B, the primary effect of a temperature variation is as if the battery voltage shifted from $V_0$ to $V_0'$ or to $V_0''$ in accordance with the extent and sense of the temperature change. In the tube, of course, the flow of current stops when the applied voltage is less than the ionizing voltage of the gas, generally as indicated in Fig. 1 by the transition from the solid to dotted line sections of each voltage/current characteristic.

In most applications of such tubes as voltage references, the current I through the tube is maintained essentially constant and the net voltage across the tube varies from V to V' or V'', following the variation of the equivalent battery from $V_0$ to $V_0'$ or $V_0''$. For a given current I passing through the tube, these relations may be expressed in mathematical form as:

(1) $\quad V = V_0 + IR_0$
(2) $\quad V' = V_0' + IR_0$
(3) $\quad V'' = V_0'' + IR_0$ The equivalent value of $V_0$ may differ slightly from one to another tube of the same type but the sign and magnitude of the change in $V_0$ per degree change in ambient temperature is essentially the same for various tubes of the same type. Actually, it is the percentage variation in $V_0$ per degree temperature change which is reproducible from tube to tube of given type but the above approximation is sufficiently close to achieve the compensation hereinafter described.

On the basis of this approximation, practical satisfactory compensation of temperature variations of $V_0$ can be obtained, as shown in Fig. 3A, by connecting a temperature-sensitive resistance $R_c$ in series with tube G. The tube and resistor are in proximity to each other and subject to the same ambient temperature conditions. In this case, the total reference voltage E is comprised of the sum of the voltage drop V across the tube and the voltage drop $IR_c$ across the compensating resistance $R_c$. Expressed in equation form and at some reference temperature such as zero degrees centigrade (0° C.)

(4) $$E = V_0 + IR_0 + IR_c$$

At an elevated temperature ($t°$ C.), $V_0$ will have changed by an amount ($vt$) where $v$ is the change in $V_0$ per degree centigrade. However, at the same time, the compensating resistance $R_c$ being subjected to the same temperature change and being of appropriate temperature-sensitive conductor, will have changed in resistance by an amount $\alpha R_c t$ where $\alpha$ is the temperature coefficient of the conductor, $R_c$ is the resistance at 0° C., and $t$ is the new temperature. At such elevated temperature, the reference voltage E' may be expressed as (5) $$E' = V_0 + vt + IR_0 + IR_c + I\alpha R_c t$$

By comparison of Equations 4 and 5, it can be seen that the reference voltage will not change with change of temperature provided that (6) $$v = -I\alpha R_c$$

By way of typical example, a type 5651 tube has an operating current range between 1.5 and 3.5 milliamperes, an average $V_0$ of about 85 volts and an average value of $v$ of $-3$ millivolts per degree centigrade. If $R_c$ is made entirely of copper, a value of $+0.004$ is obtained for $\alpha$. Hence, if the tube is operated at 2.5 milliamperes, the compensating requirement of Equation 6 is met for a 300 ohm value of $R_c$. It was found that this simple method of compensation limited the maximum voltage deviation for any of the 5651 tubes tested to less than 85 millivolts in the temperature range from $-25°$ C. to $+55°$ C. whereas without compensation the deviation is about 240 millivolts.

Similar results can be obtained at other values of tube current by using an appropriately different value for the resistance of $R_c$. For a given value of $\alpha$, the resistance of $R_c$ must be decreased for higher values of operating current and vice versa. It is not necessary to use copper for the compensating resistance. Any resistance material having a resistance-temperature characteristic suited for a given tube characteristic and operating current may be employed.

Because of slight deviations in the characteristics of tubes of even the same type and because the variation of $V_0$ over a wide temperature range is not exactly a linear function of temperature, the simple arrangement thus far described does not afford perfect compensation throughout a wide range of temperatures. However, the compensation is satisfactory for many applications and substantially extends the utility of gaseous discharge tubes as voltage references.

More exact compensation for any particular tube can be obtained by matching the resistance/temperature characteristic of $R_c$ exactly to the characteristic of that individual tube. Since the variation of $V_0$ over a wide temperature range is not exactly a linear function of temperature, Equation 5 for the reference voltage E can be rewritten in more precise form as (7) $$E = V_0 + \Delta V_0(t) + IR_0 + IR_c + I\Delta R_c(t)$$

which for perfect compensation requires that (8) $$\Delta V_0(t) = -I\Delta R_c(t)$$

where $\Delta V_0(t)$ and $\Delta R_c(t)$ represent the changes in $V_0$ and $R_c$ as functions of temperature.

It has been found possible very closely to match the temperature characteristics of resistance means $R_c$ to those of a particular tube by using for $R_c$ an appropriate series, parallel, or series-parallel combination of resistors having suitable temperature characteristics. Since various resistance materials have temperature coefficients which differ in magnitude and sign, the relative magnitudes of the component resistors of $R_c$ and their series, parallel or series-parallel combination can be selected to provide very exact compensation for any particular tube. Specifically, it is possible to match the temperature characteristics of the type 5651 tube by using for $R_c$ a simple parallel combination of copper and carbon resistors.

To provide temperature compensation under transient as well as steady-state conditions of ambient temperature, the thermal time constants of the tube G and its compensating resistance $R_c$ should be at least approximately matched. Usually, the tube responds more quickly to temperature changes than does resistor $R_c$ of conventional construction. In general, it is not practical to reduce the time constant of $R_c$ and matching of the thermal time constants is usually effected by thermally lagging the tube as by surrounding the tube with a shield of sufficient thermal capacity. If it is found that a tube responds more slowly than its compensating resistor, the thermal time constant of the resistor may be increased, as by use of an appropriate shield or core, to obtain the desired match.

Although the preceding discussion was concerned with gaseous discharge tubes whose voltage decreases with increasing temperature, tubes exhibiting an increasing voltage with increasing temperature can similarly be compensated by using for $R_c$ a resistor or combination of resistors the sign of whose resistance/temperature variation is opposite to that above discussed.

Referring to Fig. 4, the transformer 10, rectifier tube 11 and filter 12 are exemplary of a power supply providing a direct-current voltage $V_B$ at its output terminals 16, 17 which is unsuited as a voltage reference because affected by variations of input voltage for the transformer, of the load current, and of other factors. The primary of transformer 10 may be supplied from a battery through any suitable inverter-converter such as a vibro-pack or motor-alternator for mobile or field use or from a power-line when the equipment is used in fixed locations. In all cases, the output voltage $V_B$ is unsuited for use as a voltage reference.

The series resistor 13 and the gaseous discharge tube $G_1$ which may be for example a VR-150 tube provide a potential-divider network whose output voltage $V_t$ although remaining substantially constant for variations of $E_s$ is not suited as a voltage reference for reasons above discussed in connection with Figs. 1, 2A and 2B. To obtain a voltage E which is suited as a reference, the voltage $V_t$ is impressed on a second voltage-divider network comprising the resistance $R_v$ and the series combination of the gaseous discharge tube G, which may for example, be of the 5651 type, and its compensating resistor $R_c$. The load 15 is connected across the series-combination of tube G and compensating resistor $R_c$.

With the value of resistance $R_v$ selected or adjusted to satisfy the relationship expressed in Equation 6 or Equation 8, the voltage E applied to load 15 remains essentially constant over a wide range of ambient temperature and despite substantial variations in the output voltage $V_B$ of the voltage source 10—12, or equivalent. In selection or adjustment of resistance $R_v$, the proper value of current through the tube and resistor $R_c$ may be determined by milliammeter 18 whose resistance and temperature coefficient of resistance should be taken into account as it is effectively a part of the compensating resistance; preferred arrangements for standardizing voltage E are subsequently described.

For a better understanding of Fig. 4 and of more complex measuring networks herein later described, reference is made to the network of Fig. 5A and its electrical equivalent (Fig. 6).

In Fig. 5A, the gaseous discharge tube G, its compensating resistance $R_c$ and resistance $r_0$ are in series in one branch of the network. This branch is in parallel to a second branch comprising the fixed resistance R, adjustable resistance $R_s$ and fixed resistance $r_s$. The parallel branches are connected in series with adjustable resistance $R_v$ between the terminals (+, −) of a source of voltage $V_T$. Fig. 5B is similar to Fig. 5A except that tube G, as in Fig. 3B, is shown replaced, for analysis purposes, by a battery $V_0$ and a fixed resistance $R_0$.

An understanding of the manner in which the network of Fig. 5A provides a precision standard of voltage and current is best obtained by considering the manner in which $I_0$, $I_s$, $e_0$ and $e_s$ (Fig. 5B) vary with E, the total voltage across the two parallel branches.

By inspection, it may be seen that $$(9) \quad I_0 = \frac{E - V_0}{R_0 + R_c + r_0} = \frac{E}{R_0 + R_c + r_0} - \frac{V_0}{R_0 + R_c + r_0}$$

and $$(10) \quad I_s = \frac{E}{R + R_s + r_s}$$

Hence $$(11) \quad e_0 = I_0 r_0 = E \frac{r_0}{R_0 + R_c + r_0} - V_0 \frac{r_0}{R_0 + R_c + r_0}$$

and $$(12) \quad e_s = I_s r_s = E \frac{r_s}{R + R_s + r_s}$$

With a given tube at a given ambient temperature, it is assumed that all parameters are fixed in value except E and $R_v$, the latter being adjustable to effect equality of voltages $e_0$ and $e_s$ as indicated by galvanometer 19 or other suitable null detector. It may here be noted that tube G and compensating resistor $R_c$ form one arm of a bridge, that resistors R and $R_s$ form an adjacent arm of the bridge, and that fixed resistors $r_0$, $r_s$ form the other two arms of the bridge. By solution of the simultaneous Equations 11 and 12, it will be seen that balance exists for only one value of E, i. e.

$$(13) \quad E' = V_0 \frac{r_0(R + R_s + r_s)}{r_0(R + R_s) - r_s(R_0 + R_c)}$$

At balance, the following relations exist:

$$(14) \quad I_0' = V_0 \frac{r_s}{r(R + R_s) - r_s(R_0 + R_c)} = E' \frac{r_s}{r_0(R + R_s + r_s)}$$

$$(15) \quad I_s' = V_0 \frac{r_0}{r(R + R_s) - r_s(R_0 + R_c)} = \frac{E'}{R + R_s + r_s}$$

$$(16) \quad e_0' = e_s' = V_0 \frac{r_0 r_s}{r_0(R + R_s) - r_s(R_0 + R_c)} = E' \frac{r_s}{R + R_s + r_s}$$

From the foregoing relations, it can be shown that when E departs from balance by an amount ΔE, that the values of $I_0$, $I_s$, $e_0$ and $e_s$ vary in accordance with the following relations:

$$(17) \quad \frac{\Delta I_0}{I_0'} = \frac{\Delta e_0}{e_0'} = \frac{\Delta E}{E'} \cdot \frac{r_0}{R_0 + R_c + r_0} \cdot \frac{R + R_s + r_s}{r_s}$$

$$(18) \quad \frac{\Delta I_s}{I_s'} = \frac{\Delta e_s}{e_s'} = \frac{\Delta E}{E'}$$

$$(19) \quad \frac{\frac{\Delta I_0}{I_0'}}{\frac{\Delta I_s}{I_s'}} = \frac{\frac{\Delta e_0}{e_0'}}{\frac{\Delta e_s}{e_s'}} = \frac{\Delta e_0}{\Delta e_s} = \frac{r_0}{R_0 + R_c + r_0} \cdot \frac{R + R_s + r_s}{r_s}$$

The significance of these relations, particularly Equation 19, is that there is not only a single value of E for which $e_0$ is equal to $e_s$, but also that any variation of E from its balance value E' results in a much larger variation of $e_0$ than in $e_s$. Thus a change in the difference between $e_0$ and $e_s$ is a measure of a much smaller change of $e_0$.

By way of a typical example using a type 5651 tube,

| | | |
|---|---|---|
| $I_0'$ | ma [1] | 2.5 |
| $I_s'$ | ma | 10 |
| $R_0$ | ohms | 1000 |
| $R_c$ | do | 300 |
| $r_0$ | do | 2 |
| $r_s$ | do | 0.5 |
| $R + R_s$ | do | 8499.5 |
| $E'$ | volts | 85 |

[1] Milliamperes.

Substitution of these values in Equation 19 shows that for a given deviation from balance $e_0$ changes 26 times as much as $e_s$. Thus departure from the standard values of E', $I_s'$ and $e_s'$ is readily detected. For example, if there is a 0.85 volt change of E, there would be a 130 microvolt change in $e_0$ and a 5 microvolt change in $e_s$. Thus a null detector, such as galvanometer 19, sensitive to a 125 microvolt change can be used to determine that $e_s$ has not changed more than 5 microvolts, i. e., that $e_s$ is correct within 0.1%.

With the method of compensation discussed in connection with Figs. 3A, 3B using the temperature-sensitive resistor $R_c$ for compensation of $V_0$ of the gaseous discharge tube, the balance values E', $I_0'$, $I_s'$, $e_0'$ and $e_s'$ may be maintained within 0.1% over a wide range of ambient temperature. The resistor $r_0$ should have inappreciable temperature coefficient of resistance: assuming its resistance does not change more than a few tenths of a percent over the ambient temperature range, the compensation is adequate provided that $R_1 R_s$ and $r_s$ have temperature characteristics such that the ratio $$\frac{R + R_s + r_s}{r_s}$$

remains substantially constant.

In the modification of the network of Fig. 5A shown in Fig. 6, the resistor $r_s$ is replaced by a shunted slide-wire 20 and an end coil 21 so proportioned that under standardized conditions, with switch 22 in the full-line position shown, the galvanometer 19 or equivalent will indicate a null balance only with the slidewire contact 23 at a specific point on the slidewire.

If the network is not in balance for such position of the slidewire contact, the rheostat $R_v$ is adjusted to vary the input voltage until there is null response of detector 19. Following standardization, the switch 22 is thrown to the dotted line position M for measurement of the unknown voltage $e_x$. In the specific circuit shown, the unknown voltage is the output of a thermocouple having a reference junction $J_r$ and a measuring junction $J_m$. By adjusting slidewire contact 23 for null indication of detector 19, the unknown voltage is balanced against the potential difference between contact 23 and the tap point 24 of the slidewire-shunt 25. The slidewire 20 may be provided with a scale and index for direct reading of the unknown voltage.

For convenience, though not of necessity, the position of contact 23 for standardization may be the same as that for which there is zero-potential difference between the tap point 24 and contact 23. The connections to the slidewire and the tap point may be interchanged as shown in Fig. 7 in avoidance of the need to readjust contact 23 for standardization. The arrangement of Fig. 7 is otherwise similar to Fig. 6 and is the preferred arrangement for automatic stabilization in self-balancing, self-standardizing recorders such as shown for example in U. S. Letters Patent to Williams 2,367,746.

In the networks of Figs. 6 and 7, the resistance $R_s$ may be adjustable and provided with a calibrated dial for replacement or interchange of gaseous discharge tubes G precalibrated in terms of the voltage E' which will be produced when a predetermined current $I_0$ flows through the G, $R_c$, $r_0$ branch of the network. Then since the fixed resistances of the shunted slidewire, the end coil and resistor R are known, the calibrated dial of $R_s$ can be set at the value which will give the proper values of $I_s$ and $e_s$. Following this, and with the switch 22 in standardizing position, the rheostat $R_v$ is adjusted for null response of detector 19 as above described. After the slidewire current is so standardized, switch M is thrown to position M for measurement of unknown voltage $e_x$.

The arrangements of Figs. 6 and 7 may be used with previously uncalibrated tubes. For such purpose, the unknown voltage $e_x$ is temporarily replaced by a known voltage and the switch thrown alternately from standardizing to measuring positions with $R_s$ and $R_v$ alternately adjusted for null response of the detector in both positions. In the case of Fig. 6, the position of slidewire contact 23 must also concurrently be alternately set to positions corresponding with the predetermined standardized point and with the value of the known voltage. The advantage of Fig. 7 for manual operation is that contact 23 need only be preset to the point corresponding with the unknown voltage. In each case, the system is then properly standardized and subsequent variations in $V_t$ may be compensated by adjustment of rheostat $R_v$, with switch 22 in the standardizing position S. For this purpose, neither $R_v$ nor $R_s$ need be calibrated; however, if $R_s$ is provided with a calibrated dial, the dial setting may be noted as a calibration of the particular tube which may then be so marked and used as a "precalibrated" tube in similar networks.

The networks of Figs. 5A, 6 and 7, by provision of a calibrated dial for rheostat $R_v$, may be used to measure relatively small deviations in the relatively large voltage $V_t$. Equations 14 and 15 show that, at balance, the values of $I_0$ and $I_s$ are constant for any given tube and given resistance parameters. Hence at balance, the sum of $I_0$ and $I_s$ is constant and the required changes in the resistance of $R_v$ to effect balance are a measure of the changes in voltage $V_t$.

In the system of Fig. 8, a reference-voltage network similar to Figs. 6 and 7 is included as part of a calibrated, temperature-compensated, electronically regulated direct-current power supply suited for precision measurements over a wide range of ambient temperatures—specifically for measurement of temperatures in the range of from about −70° C. to about 60° C. with a limit of error not exceeding 1° C. and a sensitivity of 0.14° C. under all operating conditions including subjection of the measuring equipment as a whole, not merely the primary temperature-responsive element, to such wide range of temperatures as encountered, for example, when the equipment is airborne.

The tube $T_1$ serves as a rheostat adjustable to compensate for variations in the unregulated supply voltage $V_B$ which as in Fig. 4 may be provided by a transformer-rectifier system. The anode-cathode resistance of tube $T_1$ is automatically adjusted, as later described, by a two-stage direct-current amplifier including tubes $T_2$, $T_3$.

The major load circuit, connected between the cathode of tube $T_1$ and the B− terminal, comprises the resistance $R_v$ in series with a two-branch network having in one branch the series-combination of gaseous discharge tube G, its temperature-compensating resistance $R_c$ and resistance $r_0$ and having in the other branch the series-combination of resistances $R_s$, R, the shunted slidewire 20 and end coils 21A, 21B. Thus, the major load circuit of Fig. 8 is essentially the same as the networks of Figs. 5A, 6 and 7 above described.

The voltage E', determined largely by the characteristic of the particular reference tube G used, constitutes a predetermined level or magnitude against which deviations of the voltage $V_t$ are compared to provide corrective signals for the control grid of rheostat tube $T_1$.

The resistors 26, 27 form a potential-divider for applying to one of the control grids of tube $T_3$ a voltage $e_7$ which is a predetermined fraction of the reference voltage output E'. Since the bridge is in balance only for a predetermined value of voltage E', a change in signal voltage $e_7$ is a measure of unbalance of the bridge as well as of change of voltage E'. The resistors 28, 29 form a potential-divider for applying to the other control grid of tube $T_3$ a voltage $e_2$ which is a predetermined fraction of the voltage $V_t$. The resistances 28, 29 and $R_v$ form three arms of a bridge network whose fourth arm has a non-linear resistance characteristic and is formed by the two-branch network including the gaseous discharge tube G and its compensating resistor $R_c$.

The cathode resistor 30 is common to both triodes of tube $T_3$ to obtain sensitivity to the difference between voltages $e_2$, $e_7$ with greatly reduced sensitivity to the absolute magnitudes of those voltages. The latter also reduces the sensitivity of this amplifier stage to the effects of cathode temperature variations resulting from changes in the unregulated supply (not shown) for the heaters of tube $T_3$.

The anodes of tube $T_3$ are connected to the cathode of rheostat tube $T_1$ through the resistors 31, 32. The control grid of pentode $T_2$ in the second stage of the control amplifier is connected to the anode of one section of tube $T_3$. The anode of tube $T_2$ is connected to the cathode and to the control grid of rheostat tube $T_1$ through resistors 33 and 34 respectively.

When in operation of the system shown in Fig. 8, the supply voltage $V_B$ tends to increase, the voltage $V_t$ also tends to increase and input voltage $e_2$ of the amplifier accordingly tends to increase in proportion to the increase in $V_t$. However, the other input voltage $e_7$ of the amplifier changes very little since the regulating characteristic of tube G holds the variations in E' to a small fraction of those of $V_t$. Consequently, the potential drop across resistor 32 decreases, reducing the bias on the control grid of tube $T_2$. Therefore, the plate potential of tube $T_2$ falls increasing the bias and plate resistance of the rheostat tube $T_1$ to return the magnitudes of $V_t$ and E' substantially to their original levels. For a decrease in supply voltage, each of the above changes is in reverse sense to restore $V_t$ and E' toward their original predetermined values. As the amplifier gain is not infinite, neither $V_t$ nor E' is returned exactly to their original values since a small deviation or error signal is necessary to maintain the different bias on the rheostat tube $T_1$. In practice, however, the amplifier gain is sufficiently high to hold the variations in $V_t$ and E' to very small value.

Expressed another way, the bridge having resistors 28, 29 as two of its arms with resistance $R_v$ and the two-branch network as the other pair of arms is in balance for only one value of voltage $V_t$. A change in voltage $V_B$ causes a change in voltage $V_t$ which unbalances the bridge. The control amplifier responds to such unbalance and adjusts the rheostat tube $T_1$ to restore $V_t$ to its proper value for the changed value of voltage $V_B$.

Use of the potential-divider 26, 27 to obtain a reduced voltage ($e_7$) varying with E' provides adequate plate-to-cathode voltage and adequate gain in the first amplifier stage and allows direct connection from the output anode of tube $T_3$ to the control grid of tube $T_2$. By this means, adequate overall gain of the amplifier is obtained without requiring an inordinately high value of $V_t$. In particular, it has been found possible to obtain proper operation with values of 87 and 120 volts for E' and $V_t$ respectively. In such typical arrangement using parameters tabulated below, the pentode supply voltage V is 33 volts and changes very little as different 5651 tubes are used as tube G. In practice, the value of E' changes by only about 2 volts for different 5651 tubes so that the supply voltage for tube $T_2$ is always adequate.

Tubes

| | |
|---|---|
| G, $G_c$ | 5651 |
| $T_1$ | 6AQ5 |
| $T_2$ | 6AU6 |
| $T_3$ | 12AX7 |

Resistances

| | |
|---|---|
| $R_c$ | 300 ohms at 95° F. (copper). |
| $V_0$ | 2652 ohms. |
| $R_v$ | Adjustable 2500 to 2800 ohms. |
| $R_s R_{sc}$ | Adjustable 0–800 ohms. |
| R | 8,200 ohms. |
| 20 | 0.98 ohms. |
| 21A, 21B | 0.87 ohms; 204.76 ohms at 0° C. |
| 25A, 25B | 1.36 ohms at 0° C.; 205.24 ohms. |
| 26 | 200,000 ohms. |
| 27 | 160,000 ohms. |
| 28 | 500,000 ohms. |
| 29 | 240,000 ohms. |
| 30 | 1,500,000 ohms. |
| 31 | 3,500,000 ohms. |
| 32 | 3,500,000 ohms. |
| 33 | 4,700,000 ohms. |
| 34 | 10,000 ohms. |

From the previous discussion of Figs. 6 and 7, it will be understood that, using a precalibrated voltage reference tube G, adjustment of the tube current to the value for which the tube is temperature-compensated is effected by throwing switch 22 to the standardizing position S, setting the calibrated dial of resistance $R_s$ to the proper value and then adjusting resistance $R_v$ for balance of the two-branch network as described in connection with Figs. 6 and 7. In the particular arrangement shown in Fig. 8, the unbalance detector 19A comprises an amplifier system 35, generally similar to that of the aforesaid Williams Patent 2,367,746, whose output is supplied to a reversible motor 36 which adjusts the movable contact of slidewire 23 for balance and concurrently positions the pointer or stylus 37 of a recorder. Thus, in such arrangement, the resistance $R_v$ is adjusted until the pointer 37 stops at the calibration point of the associated scale.

To reduce the effects, upon the temperature compensation, of transient thermal disturbances while the temperature is changing, the tube G may be thermally lagged, as mentioned in discussion of Fig. 3A, to make its thermal time-response substantially match that of its compensating resistor $R_c$. Additionally, the resistances $R_v$, R, $R_s$, $R_0$, $r_0$, the shunted slidewire circuit and tube G should be in close proximity to minimize temperature differences between these elements: also the thermal time constants of these elements should be made as small and as nearly alike as practicable to minimize differences in their time-response to temperature changes. Lastly, the resistors 26, 27 and 28, 29 should be of similar material, similar construction and similar thermal time constant, and should be in proximity to each other to minimize transient or equilibrium variation in the voltage-dividing ratio. This latter precaution is not necessary for accuracy of restandardization, but it minimizes the need for frequent restandardization while the ambient temperature is changing and helps reduce the warmup time after a shut-down period.

For checking whether tube G is holding calibration, a second tube $G_c$ and an associated resistor $R_{sc}$ may be provided. The resistor $R_{sc}$ is set to the proper value for the check tube $G_c$. With a constant input signal applied, the stability of tube G may be checked by operating the ganged switches 38, 39 from the normal position N to the check position K, and if, after the circuit has been standardized for the check tube, the same reading of the recorder is obtained, it can be safely assumed that tube G is holding calibration.

It is to be noted that should it be necessary to replace any one or more of tubes $T_1$, $T_2$, $T_3$ or any other component of the system except those of the two-branch network including the voltage-reference tube and the calibrated measuring slidewire, the substitution of a new component or components does not require the services of a skilled technician or elaborate test equipment to return the system to a standardized condition. The tube G itself serves as the calibration standard and, after replacement of the defective component, it is only necessary to readjust the resistor $R_v$ to the value for which the current through tube G is at the predetermined calibration value. This feature is of particular value for field use of the system where neither skilled technicians nor test equipment are ordinarily available.

What is claimed is:

1. An arrangement for providing a constant output voltage from a first voltage source subject to variations and despite changes in ambient temperature comprising a network having first and second branches connected in parallel to said first voltage source, a gaseous discharge tube in said first branch, temperature-sensitive resistance means in said first branch in series with said tube and traversed by the current thereof supplied from said first source, said temperature-sensitive resistance means being subjected to the same ambient temperature as said tube and having such magnitude of resistance and such temperature characteristic of resistance that the effects of ambient temperature upon the voltage/current characteristic of said tube are compensated at a particular value of tube current, a measuring slidewire in said second branch, connections for connecting a source of unknown voltage between the relatively adjustable contact of said slidewire and a fixed point in said second branch, means responsive to the difference between said unknown voltage and the voltage between said point and said relatively adjustable contact of the measuring slidewire for predetermining the magnitude of said unknown voltage, adjustable resistance means connected between said network and said first voltage source for traverse by and adjustment of the sum of the currents traversing said branches, and means for indicating when the current traversing said tube is at said particular value for which the voltage across said parallel branches of the network is constant despite variations of said first voltage source and variations of ambient temperature.

2. An arrangement for providing a constant output voltage from a voltage source subject to variations and despite changes in ambient temperature comprising a network having branches connected in parallel to said voltage source, a gaseous discharge tube in one of said branches, temperature-sensitive resistance means in said one of said branches in series with said tube and traversed by the current thereof supplied from said source, said resistance means being subjected to the same ambient temperature as said tube and having such magnitude of resistance and such temperature characteristic of resistance that the effects of changes in ambient temperature upon the voltage/current characteristic of said tube are compensated at a particular value of tube current, adjustable resistance means connected between said network and said source for traverse by and adjustment of the sum of the currents traversing said branches, a rheostat tube connected in series with said adjustable resistance means and said network, an amplifier providing the control bias for said rheostat tube and having input connections applying to said amplifier two input signals respectively corresponding with the voltage across said network and with the sum of that voltage and the voltage drop across said adjustable resistance means, and means for indicating when the current traversing said tube is at said particular value for which the voltage across said parallel branches of the network is constant despite variations of said voltage source and variations of ambient temperature.

3. An arrangement as in claim 2 in which said signals are derived from potential dividers, in which said voltage sum provides the anode-cathode voltage for one stage of said amplifier, and in which said voltage drop provides the anode-cathode voltage for a second stage of said amplifier.

4. An arrangement for supplying constant voltage to a load circuit comprising a source of voltage subject to variations, a gaseous discharge tube whose voltage/current characteristic is subject to variations with changes of ambient temperature, a temperature-sensitive resistance means in series with said tube and said source to compensate for said variations of said tube characteristic at a predetermined value of tube current, a Wheatstone bridge having said tube and said serially-connected temperature-sensitive resistance means in one of two bridge arms in series with said source, means for connecting the load in one of two other serially-connected bridge arms, said bridge being in balance when said tube current is of said predetermined value, means adjustable to vary the current from said source to said bridge including the load and the series-combination of said tube and resistance means, and means for indicating when the tube current is of said predetermined value comprising means responsive to unbalance of said bridge.

5. An arrangement for supplying constant voltage to a load circuit comprising a source of voltage subject to variations, a gaseous discharge tube whose voltage-current characteristic is subject to variation with changes of ambient temperature, a temperature-sensitive resistance means in series with said tube and said source to compensate for said variations of said tube characteristic at a predetermined value of tube current, a bridge including the load in parallel with the series combination of said tube and said temperature-sensitive resistance means, means adjustable to vary the current from said source to said bridge, and means responsive to unbalance of said bridge for adjusting said current-varying means to restore said bridge to balance for said predetermined value of tube current.

6. An arrangement for providing a desired constant current through a load comprising a source of voltage subject to variations, a network having parallel branches, a first of which includes said load and a first adjustable resistance in series therewith and a second of which includes a gaseous-discharge tube whose voltage/current characteristic is subject to variations with changes in ambient temperatures and temperature-sensitive resistance means in series with said tube to compensate for said tube characteristic at a predetermined value of tube current, a second adjustable resistance in series with said network and said source, and responsive means for indicating when by adjustment of said first and second resistances the currents in said first and second branches of the network concurrently respectively correspond with said predetermined value of tube current and said desired value of load current.

7. An arrangement for providing a constant reference voltage across a measuring slidewire of fixed resistance comprising a source of voltage subject to variations, a network having parallel branches, a first of which includes said measuring slidewire and a first adjustable resistance in series therewith and a second of which includes a gaseous-discharge tube whose voltage/current characteristic is subject to variations with changes in ambient temperature and temperature-sensitive resistance means in series with said tube to compensate for said tube characteristic at a predetermined value of tube current, a second adjustable resistance connected between said network and said source, and responsive means for indicating when by adjustment of said first and second resistances the currents in said first and second branches of the network respectively correspond with said predetermined value of tube current and with the slidewire current affording said reference voltage.

8. An arrangement as in claim 7 in which the responsive means is a single indicating means, and which includes switching means operable to one setting to connect said indicating means between predetermined points in said branches to check the tube current and operable to another setting to connect said indicating means in a measuring circuit between the relatively adjustable contact of said slidewire and a fixed point in said second branch.

9. An arrangement for providing a constant voltage across a load comprising a voltage source subject to variation, a bridge network supplied from said source and including in one arm a gaseous-discharge tube in series with temperature-sensitive resistance means of resistance and temperature-coefficient of resistance providing compensation for effects of ambient temperature upon the voltage/current characteristics of said tube at a predetermined value of tube current, means responsive to unbalance of said bridge, resistance means adjustable to effect balance of said bridge at said predetermined value of tube current, and means for connecting the load across said arm of the bridge.

10. An arrangement as in claim 9 additionally including voltage-varying means in circuit with said source and actuated by said responsive means.

11. An arrangement for providing a constant voltage across a load comprising a voltage source subject to variation, a main bridge network including a subsidiary bridge network in one arm thereof, said subsidiary bridge network including in one arm a gaseous-discharge tube in series with temperature-sensitive resistance means of resistance and temperature coefficient of resistance providing compensation for effects of ambient temperature upon the voltage/current characteristics of said tube at a predetermined value of tube current, voltage-varying means in circuit with said source and said main bridge, means responsive to unbalance of said main bridge for adjusting said voltage-varying means, means responsive to unbalance of said subsidiary bridge, resistance means in series with said subsidiary bridge and adjustable to effect balance thereof at said predetermined value of tube current, and connections for including the load in said subsidiary bridge in a current branch parallel to the branch including said tube and said temperature-sensitive resistance means.

12. An arrangement for providing a desired constant current through a load comprising a source of voltage subject to variations, a network having parallel branches, a first of which includes said load and a second of which includes a calibrated gaseous-discharge tube providing a fixed reference voltage at a predetermined value of tube current, standardizing means adjustable to vary the current from said source to said network, and responsive means for indicating when the adjustment of said standardizing means provides said predetermined value of tube current.

13. An arrangement for providing a constant reference voltage across a measuring slidewire of fixed resistance comprising a source of voltage subject to variations, a network having two parallel branches, a pair of calibrated reference-voltage tubes, a pair of calibrated resistances, switching means operable to different positions for selectively connecting said tubes in one of said branches and for concurrently connecting the corresponding one of said calibrated resistances in series with the measuring slidewire in the other of said branches, an adjustable standardizing resistance connected between said network and said source, responsive means for indicating when for the different positions of said switching means the setting of said standardizing resistance provides the tube current for which said tubes are respectively calibrated, and means for applying a test signal to the branch of said network including said slidewire to check whether for the different positions of said switching means the corresponding positions of the measuring slidewire are the same.

14. An arrangement for providing a desired constant current through a load comprising a source of voltage subject to variations, a network having parallel branches, a first of which includes said load and a first resistance means adjustable to vary the load current for a given voltage drop across said network and a second of which includes a gaseous-discharge tube whose voltage/current characteristic is subject to variations with changes in ambient temperature and temperature-sensitive resistance means in series with said tube to compensate for said tube characteristic at a predetermined value of tube current, a second adjustable resistance means in series with said network and said source, and responsive means for indicating when by adjustment of said first and second resistance means the currents in said first and second branches of the network concurrently respectively provide said predetermined value of the tube current and said desired value of the load current.

15. An arrangement for providing a constant reference voltage across a measuring slidewire of fixed resistance comprising a source of voltage subject to variation, a network having parallel branches, a first of which includes said measuring slidewire and a first resistance means adjustable to vary the slidewire current for a given voltage drop across said network and a second of which includes a gaseous-discharge tube whose voltage/current characteristic is subject to variations with changes in ambient temperature and temperature-sensitive resistance means in series with said tube to compensate for said tube characteristic at a predetermined value of tube current, a second adjustable resistance means connected between said network and said source, and responsive means for indicating when by adjustment of said first and second resistance means the currents in said first and second branches respectively provide said predetermined value of the tube current and the value of slidewire current affording said reference voltage.

References Cited in the file of this patent

UNITED STATES PATENTS

| | | |
|---|---|---|
| 2,175,890 | Glowatzki | Oct. 10, 1939 |
| 2,332,073 | Grierson | Oct. 19, 1943 |
| 2,546,039 | Moir et al. | Mar. 20, 1951 |
| 2,620,664 | Lodge | Oct. 9, 1952 |

FOREIGN PATENTS

| | | |
|---|---|---|
| 354,550 | Great Britain | Aug. 13, 1931 |